United States Patent
Kirby (10) Patent No.: US 10,360,200 B1
(45) Date of Patent: Jul. 23, 2019

(54) NUMBERING AND LAYOUT METHOD FOR FLOW CHARTS

(71) Applicant: TurboPatent Inc., Seattle, WA (US)

(72) Inventor: Chad Kirby, Seattle, WA (US)

(73) Assignee: TurboPatent Inc., Seattle, WA (US)

( * ) Notice: Subject to any disclaimer, the term of this patent is extended or adjusted under 35 U.S.C. 154(b) by 343 days.

(21) Appl. No.: 15/413,332

(22) Filed: Jan. 23, 2017

Related U.S. Application Data (60) Provisional application No. 62/281,641, filed on Jan. 21, 2016.

(51) Int. Cl.
*G06F 16/00* (2019.01)
*G06F 16/22* (2019.01)
*G06F 16/25* (2019.01)

(52) U.S. Cl.
CPC ........ *G06F 16/2246* (2019.01); *G06F 16/252* (2019.01)

(58) Field of Classification Search
CPC .... G06F 16/2246; G06F 16/252; G06F 16/22; G06F 16/25; G06F 16/00; G06F 17/30; G06F 19/3481; G06F 16/9024; G06Q 10/06375
See application file for complete search history.

(56) References Cited

U.S. PATENT DOCUMENTS

| | | | | |
|---|---|---|---|---|
| 9,613,086 B1* | 4/2017 | Sherman | ............... | G06F 16/248 |
| 9,779,147 B1* | 10/2017 | Sherman | ............... | G06F 16/248 |
| 2002/0118214 A1* | 8/2002 | Card | ..................... | G06F 16/954 707/E17.111 |
| 2003/0085931 A1* | 5/2003 | Card | ..................... | G06F 16/954 707/E17.111 |
| 2004/0154009 A1* | 8/2004 | Reynaud | .................... | G06F 8/51 717/155 |
| 2005/0060647 A1* | 3/2005 | Doan | .................... | G06F 16/248 715/205 |
| 2006/0150168 A1* | 7/2006 | Mitchell | ............. | G06F 12/0253 717/156 |
| 2007/0100916 A1* | 5/2007 | Konecny | ............... | G06F 9/5016 707/999.205 |
| 2012/0233159 A1* | 9/2012 | Datta | .................. | G06K 9/6228 707/728 |
| 2013/0042119 A1* | 2/2013 | Bennett | ............... | G06F 13/1684 713/300 |
| 2016/0359728 A1* | 12/2016 | Ficara | ..................... | H04L 45/14 709/231 |

OTHER PUBLICATIONS

"Effects of Fisheye on Visualizing Connections between Nodes"—Erika Darling et al. (The MITRE Corporation, Bedford, MA, 01730, , USA CHI 2005 (Late Breaking Results: Posters Apr. 2-7, 2005 Portland=, Oregon, USA (pp. 1328-1330).*

* cited by examiner

Primary Examiner — Anh Ly
(74) Attorney, Agent, or Firm — Rowan TELS LLC (57) ABSTRACT

A process for numbering flowchart elements populates a graphical display with a collection of flowchart elements and ranks the flowchart elements based on the flowchart elements' geometric location. The process separates the elements into ranked branches and trees, and numbers each element according to the chart element's position within the branches and trees, relative to the other chart elements.

6 Claims, 9 Drawing Sheets

NUMBERING AND LAYOUT METHOD FOR FLOW CHARTS

CROSS-REFERENCE TO RELATED APPLICATIONS

This application claims benefit under 35 U.S.C. 119 to U.S. application Ser. No. 62/281,641, filed on Jan. 21, 2016, and incorporated herein by reference in its entirety.

BACKGROUND

The fundamental problem posed by human-computer interaction is that computer data exists in a strictly logical world and computer output is limited by the input received from the user. In contrast to the starkly logical operations of computers, humans exist in a world of abstraction, because of this, the ones and zeros stored in the computer memory must be linked to an interface which allows a human being to process and understand the information stored within the computer.

Because of the fundamental difference in "thought" processes between computers and humans, poor interface design leads to a great deal of user frustration: the user receives outputs from the machine which are not what they hoped to receive. This GIGO (garbage-in garbage-out) issue, is not the fault of the machine itself, which does exactly as instructed, but is rather a shortcoming of the machine's interface which failed to allow the user to interact with the underlying logic in a manner that the user understood.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Glossary

"Associator" in this context refers to logic to associate a number with a chart node based on the chart node's position in an enumerated list "Chart node" in this context refers to a single element in a graphical chart such as a flow chart, tree or diagram "Chart node collection" in this context refers to a collection of one or more chart nodes, such as a tree, list or other grouping.

"Connection list" in this context refers to a list of links associated with each node.

"Display surface" in this context refers to an output device for visual information, such as a GUI (Graphical User Interface)

"Geometric ranker" in this context refers to logic to identify the location of an element, tree or branch on at least one axis, and rank it relative to the location of other elements within the same graphical chart and add the element to an ordered enumeration list.

"Link parser" in this context refers to logic to read chart elements, count the links to each element and determine which are inbound links, and to generate a list delineating the connections to each of the elements.

"Numbering schema" in this context refers to a pattern or method of numbering. This may be numbering by integers, odd integers, decimals and may include alphanumeric characters such as 1a, 2b etc.

"Ordered enumeration list" in this context refers to data in memory specifying a list of elements and the order of those elements.

"Root identifier" in this context refers to logic to read though a connection list, to identify the elements within the list which are root nodes, that is, which elements have no inbound links from other elements, and adding these elements to a root node list.

"Sequencer" in this context refers to logic for the automatic determination or regulation of a sequence.

Description

References to "one embodiment" or "an embodiment" do not necessarily refer to the same embodiment, although they may. Unless the context clearly requires otherwise, throughout the description and the claims, the words "comprise," "comprising," and the like are to be construed in an inclusive sense as opposed to an exclusive or exhaustive sense; that is to say, in the sense of "including, but not limited to." Words using the singular or plural number also include the plural or singular number respectively, unless expressly limited to a single one or multiple ones. Additionally, the words "herein," "above," "below" and words of similar import, when used in this application, refer to this application as a whole and not to any particular portions of this application. When the claims use the word "or" in reference to a list of two or more items, that word covers all of the following interpretations of the word: any of the items in the list, all of the items in the list and any combination of the items in the list, unless expressly limited to one or the other. Any terms not expressly defined herein have their conventional meaning as commonly understood by those having skill in the relevant art(s).

Various logic functional operations described herein may be implemented in logic that is referred to using a noun or noun phrase reflecting said operation or function. For example, an association operation may be carried out by an "associator" or "correlator". Likewise, switching may be carried out by a "switch", selection by a "selector", and so on.

"Associator" in this context refers to a correlator (see the definition for Correlator).

"Circuitry" in this context refers to electrical circuitry having at least one discrete electrical circuit, electrical circuitry having at least one integrated circuit, electrical circuitry having at least one application specific integrated circuit, circuitry forming a general purpose computing device configured by a computer program (e.g., a general purpose computer configured by a computer program which at least partially carries out processes or devices described herein, or a microprocessor configured by a computer program which at least partially carries out processes or devices described herein), circuitry forming a memory device (e.g., forms of random access memory), or circuitry forming a communications device (e.g., a modem, communications switch, or optical-electrical equipment).

"Classifier" in this context refers to a specific type of correlator/associator logic that associates one or more inputs with a category, class, or other group sharing one or more common characteristics. An example of a classifier that may commonly be implemented in programmable hardware is a packet classifier used in network switches, firewalls, and routers (e.g., packet classifiers utilizing Ternary Content Addressable Memories). An example software or firmware classifier is: if (input1.value<12.5) input1.group=group1; else if (input1.value>=12.5 and input1.value<98.1) input1.group=group2; else input1.group=group3; Other examples of classifiers will be readily apparent to those of skill in the art, without undo experimentation.

"Combiner" in this context refers to a logic element that combines two or more inputs into fewer (often a single) output. Example hardware combiners are arithmetic units (adders, multipliers, etc.), time-division multiplexers, and analog or digital modulators (these may also be implemented is software or firmware). Another type of combiner builds an association table or structure (e.g., a data structure instance having members set to the input values) in memory for its inputs. For example: val1, val2, val3→combiner logic→{val1, val2, val3} set.val1=val1; set.val2=val2; set.val3=val3; Other examples of combiners will be evident to those of skill in the art without undo experimentation.

"Comparator" in this context refers to a logic element that compares two or more inputs to produce one or more outputs that reflects similarity or difference of the inputs. An example of a hardware comparator is an operational amplifier that outputs a signal indicating whether one input is greater, less than, or about equal to the other. An example software or firmware comparator is: if (input1==input2) output=val1; else if (input1>input2) output=val2; else output=val3; Many other examples of comparators will be evident to those of skill in the art, without undo experimentation.

"Correlator" in this context refers to a logic element that identifies a configured association between its inputs. One examples of a correlator is a lookup table (LUT) configured in software or firmware. Correlators may be implemented as relational databases. An example LUT correlator is: |low_alarm_condition|low_threshold_value|0||safe_ condition|safe_lower_bound|safe_upper_bound||high_a- larm_condition|high_threshold_value|0| Generally, a correlator receives two or more inputs and produces an output indicative of a mutual relationship or connection between the inputs. Examples of correlators that do not use LUTs include any of a broad class of statistical correlators that identify dependence between input variables, often the extent to which two input variables have a linear relationship with each other. One commonly used statistical correlator is one that computes Pearson's product-moment coefficient for two input variables (e.g., two digital or analog input signals). Other well-known correlators compute a distance correlation, Spearman's rank correlation, a randomized dependence correlation, and Kendall's rank correlation. Many other examples of correlators will be evident to those of skill in the art, without undo experimentation.

"Firmware" in this context refers to software logic embodied as processor-executable instructions stored in read-only memories or media.

"Hardware" in this context refers to logic embodied as analog or digital circuitry.

"Incrementer" in this context refers to logic to advance (increase or decrease) a counting or index value by a fixed or predictably variable amount. Examples of hardware incrementers include adder arithmetic circuits and counter circuits. An example of a software incrementer is: x=x+ incrementValue. Incrementers may be used as counters, or as logic to advance a referencial or associative index in a memory data structure.

"Logic" in this context refers to machine memory circuits, non transitory machine readable media, and/or circuitry which by way of its material and/or material-energy configuration comprises control and/or procedural signals, and/ or settings and values (such as resistance, impedance, capacitance, inductance, current/voltage ratings, etc.), that may be applied to influence the operation of a device. Magnetic media, electronic circuits, electrical and optical memory (both volatile and nonvolatile), and firmware are examples of logic. Logic specifically excludes pure signals or software per se (however does not exclude machine memories comprising software and thereby forming configurations of matter).

"Parser" in this context refers to logic that divides an amalgamated input sequence or structure into multiple individual elements. Example hardware parsers are packet header parsers in network routers and switches. An example software or firmware parser is: aFields=split("val1, val2, val3", ","); Another example of a software or firmware parser is: readFromSensor gpsCoordinate; x_pos=gpsCoordinate.x; y_pos=gpsCoordinate.y; z_pos=gpsCoordinate.z; Other examples of parsers will be readily apparent to those of skill in the art, without undo experimentation.

"Programmable device" in this context refers to an integrated circuit designed to be configured and/or reconfigured after manufacturing. The term "programmable processor" is another name for a programmable device herein. Programmable devices may include programmable processors, such as field programmable gate arrays (FPGAs), configurable hardware logic (CHL), and/or any other type programmable devices. Configuration of the programmable device is generally specified using a computer code or data such as a hardware description language (HDL), such as for example Verilog, VHDL, or the like. A programmable device may include an array of programmable logic blocks and a hierarchy of reconfigurable interconnects that allow the programmable logic blocks to be coupled to each other according to the descriptions in the HDL code. Each of the programmable logic blocks may be configured to perform complex combinational functions, or merely simple logic gates, such as AND, and XOR logic blocks. In most FPGAs, logic blocks also include memory elements, which may be simple latches, flip-flops, hereinafter also referred to as "flops," or more complex blocks of memory. Depending on the length of the interconnections between different logic blocks, signals may arrive at input terminals of the logic blocks at different times.

"Selector" in this context refers to a logic element that selects one of two or more inputs to its output as determined by one or more selection controls. Examples of hardware selectors are multiplexers and demultiplexers. An example software or firmware selector is: if (selection_control==true)

output=input1; else output=input2; Many other examples of selectors will be evident to those of skill in the art, without undo experimentation.

"Sequencer" in this context refers to logic to generate an ordered list of outputs from either an unordered or partially ordered set of inputs, or from a starting input and rules to generate next inputs. One attribute of a sequencer is that the outputs are done sequentially, meaning one after the other in time. An example of a hardware sequencer is a multiplexer with a counter driving its selection input. An example of a software or firmware sequencer is: out=val++; Other examples of hardware and software or firmware sequencers will now be readily apparent to those of skill in the relevant arts.

"Software" in this context refers to logic implemented as processor-executable instructions in a machine memory (e.g. read/write volatile or nonvolatile memory or media).

"Switch" in this context refers to logic to select one or more inputs to one or more outputs under control of one or more selection signals. Examples of hardware switches are mechanical electrical switches for switching power to circuits, devices (e.g., lighting), or motors. Other examples of hardware switches are solid-state switches such as transistors. An example of a hardware or firmware switch is: if (selection==true) output=input; else output=0; A somewhat more complicated software/firmware switch is: if (selection1==true and selection2==true) output=input1; else if (selection1==true and selection2==false) output=input2; else if (selection1==false and selection2==true) output=input3; else output=noOp; Switches operate similarly to selectors in many ways (see the definition of Selector), except in some cases switches may select all inputs to the output, (s) not select among inputs. Other examples of switches will be readily apparent to those having skill in the art, without undo experimentation.

Embodiments of a system and process are disclosed, which adapt the human-computer interface to allow people to more intuitively interact with and assemble flow-charts. This may be accomplished by utilizing methods which allow the computer to predict a sequential ordering of elements in a tree, similar to a human-selected ordering, based on the spatial positioning of the chart element within the tree as well as the spatial positioning of the tree within a graphical user interface. The process first accepts a user-generated graphical chart diagram and finds all the unconnected trees within the diagram. The process then finds the roots of all of the trees and then ranks the trees based on the root position. The process further ranks the individual branches within each tree, and the elements within each branch based on their position relative to their parent. This allows the user to lay out a graphical chart (such as a flowchart) without denoting the specific sequence of the different elements. Such logic may be employed where a graphical chart being constructed is a time or sequence-dependent flowchart, i.e. a chart where information on the order in which steps are performed is important. This process allows for useful sequential information to be extracted from the diagram and further used to construct other data structures to model the tree. Steps in the process may also be transferred into natural language to allow for a natural construction of a time-dependent description of the process that is being performed. The order and ranking paradigm (specification of geometric ranking values associated with a sequence) may be adjusted to further enhance the prediction of proper order of flow chart elements.

Drawings

Figure 1:
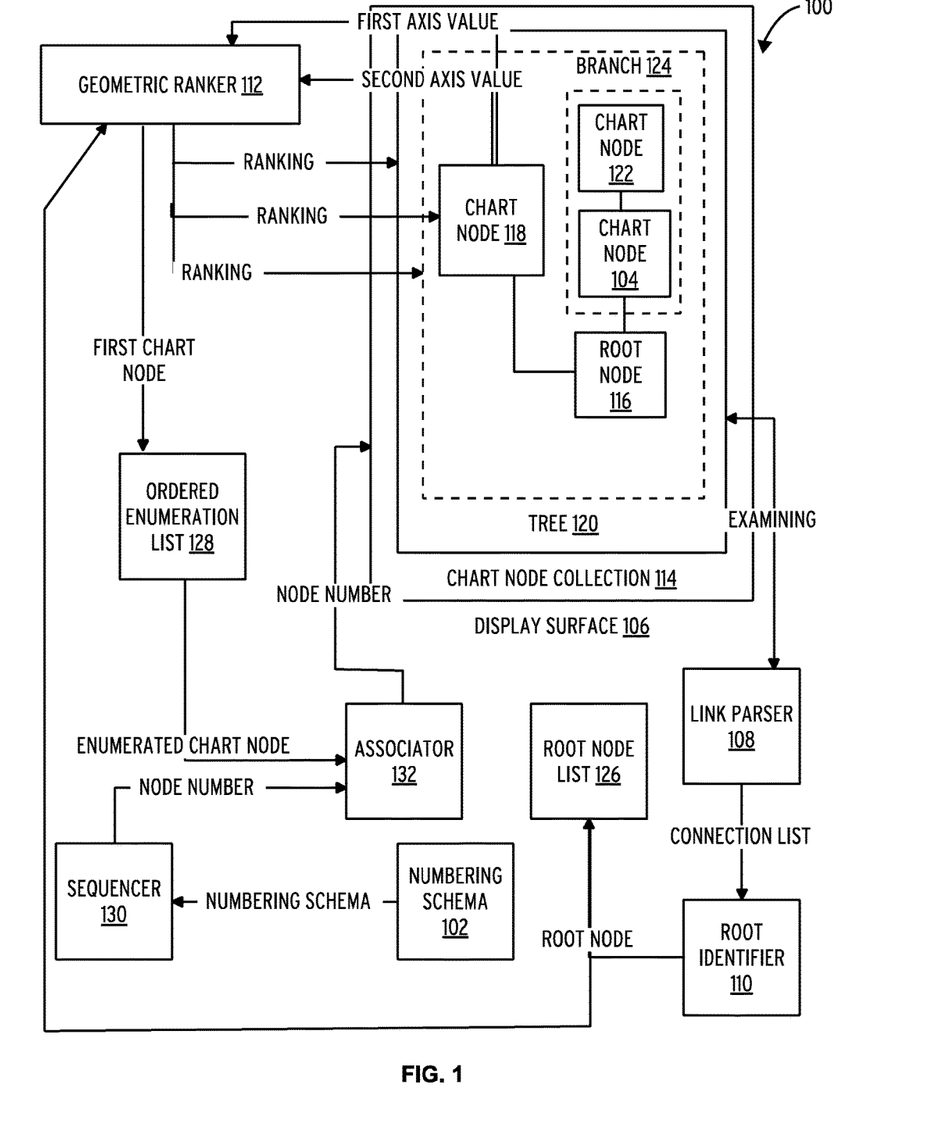
FIG. 1 illustrates an embodiment of a system for numbering flowchart elements 100.

FIG. 1 illustrates an embodiment of a system for numbering flowchart elements 100.

A system for numbering flowchart elements 100 comprises: a numbering schema 102, geometric ranker 112, chart node 118, chart node 122, chart node 104, root node 116, ordered enumeration list 128, branch 124, tree 120, chart node collection 114, display surface 106, associator 132, sequencer 130, numbering schema 102, root node list 126, root identifier 110 and link parser 108.

The tree 120 may be ranked within the chart node collection 114 based on its geometric rank determined by the geometric ranker 112 using the first axis value and the second axis value corresponding to that tree's root node 116. The root node 116 of the tree 120 may be identified by root identifier 110 by utilizing the number of inbound links listed in a connection list by the link parser 108. The root node 116, once identified, may be added to the root node list 126. The geometric ranker 112 may further rank each chart node relative to its trees constituent nodes, each branch relative to its tree's constituent branches and each tree relative to its chart node collections constituent trees. The branch 124 may be ranked based on the root node of that branch, chart node 104.

Ranked elements may be added to the ordered enumeration list 128 as enumerated chart nodes. The enumerated chart nodes may then be associated with a node number determined by a sequencer 130 utilizing a numbering schema 102. The node number may then be displayed with its associated node on the display surface 106.

Figure 2:
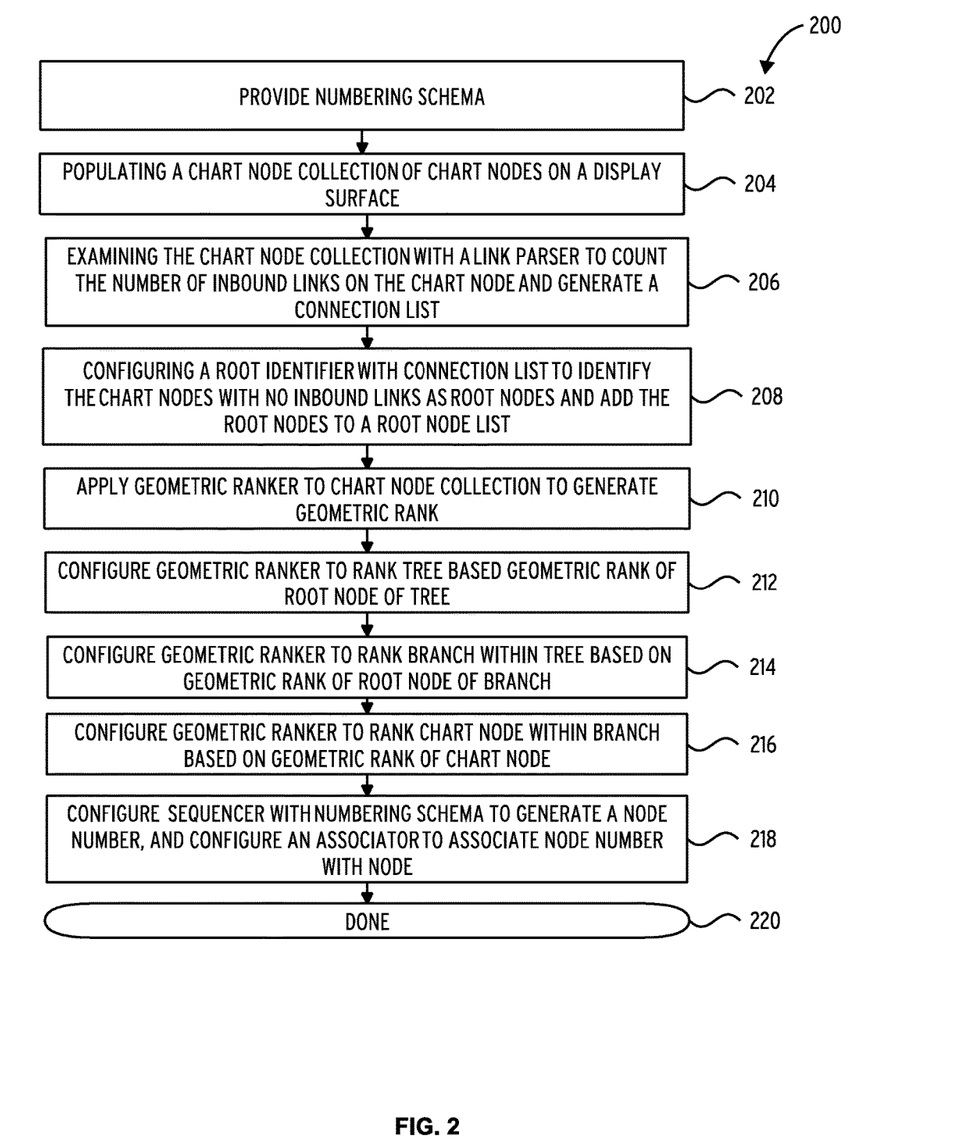
FIG. 2 illustrates an embodiment of a process for numbering flowchart elements 200.
Figure 3:
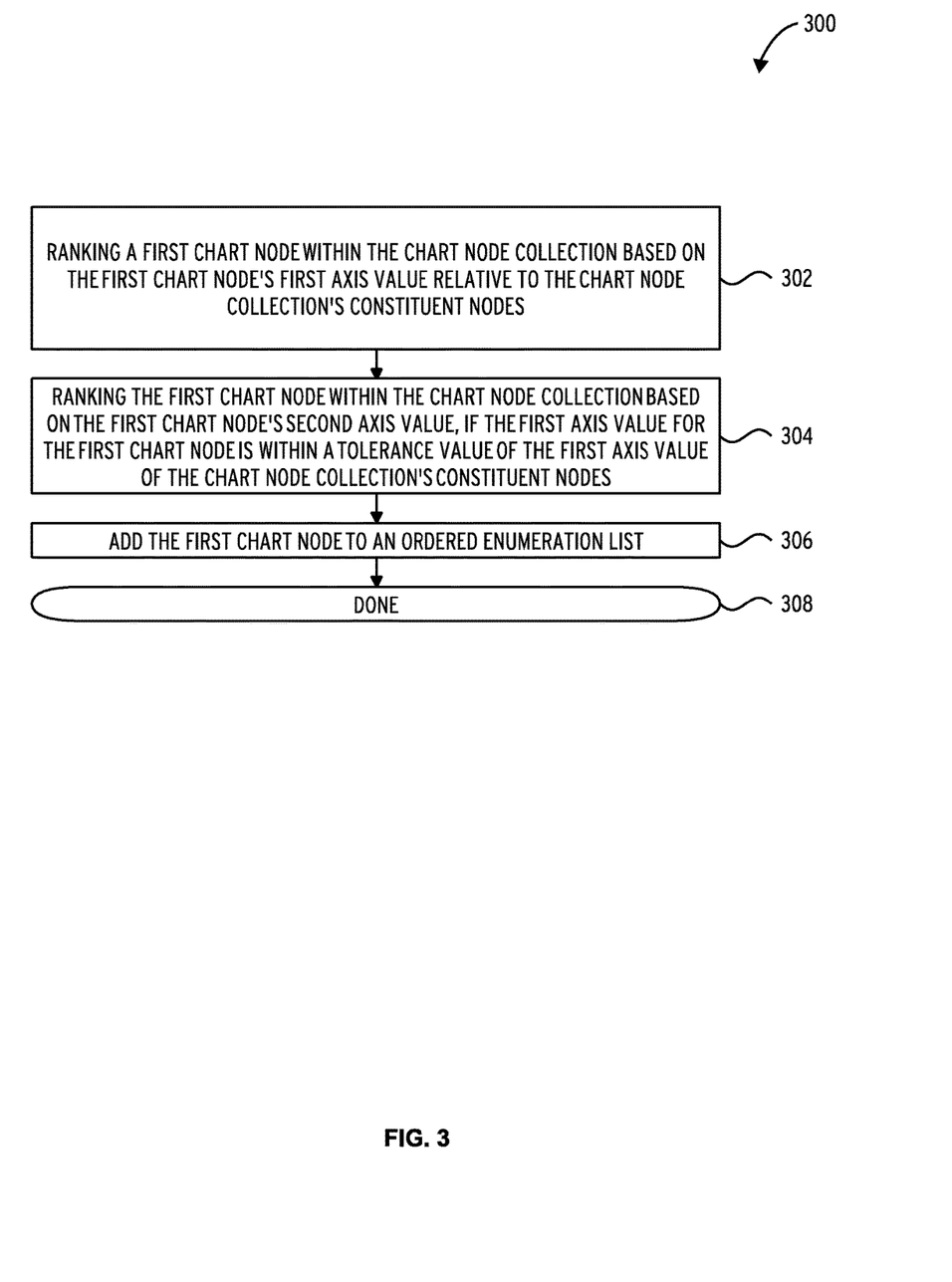
FIG. 3 illustrates an embodiment of a process for generating a geometric rank 300.
Figure 4:
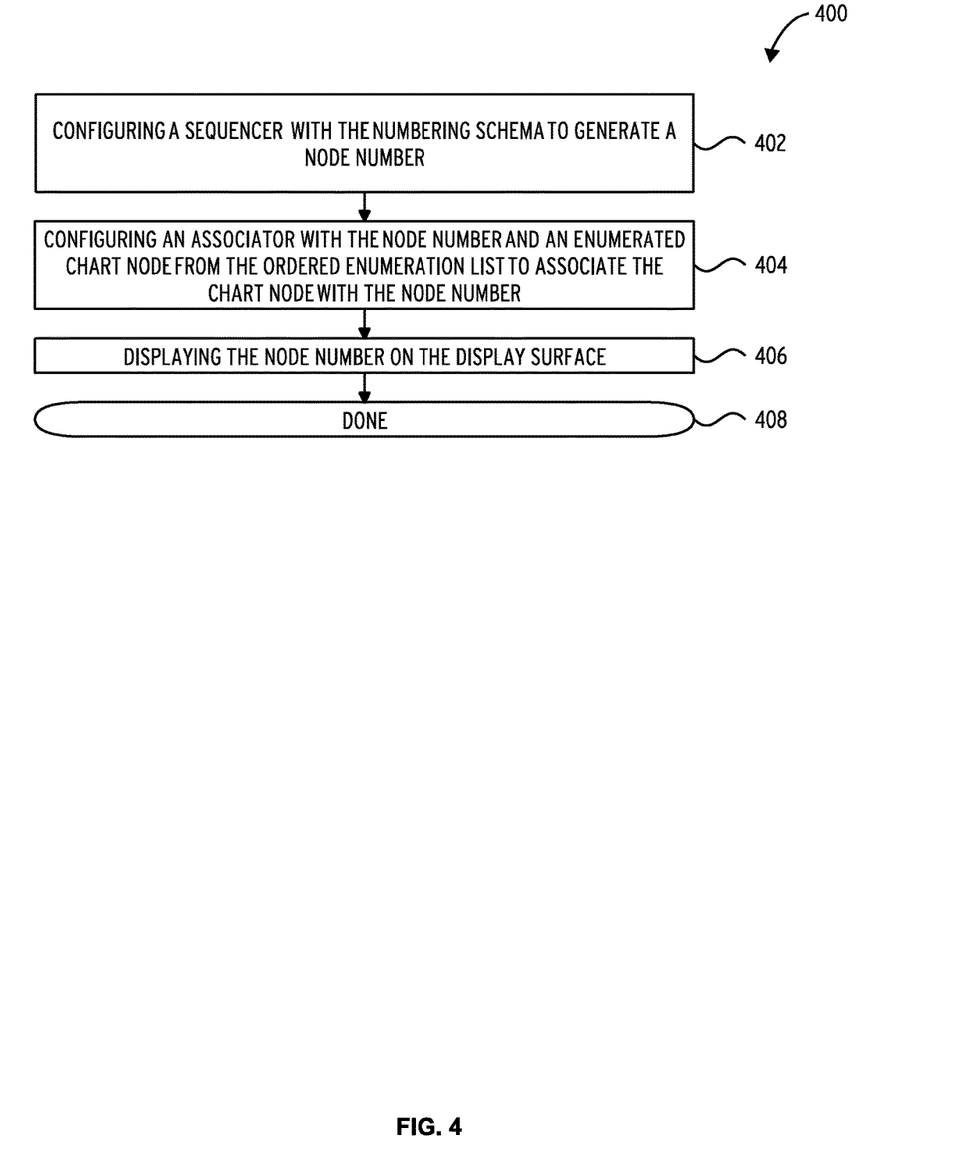
FIG. 4 illustrates an embodiment of a process for numbering chart nodes on a display surface 400

The system for numbering flowchart elements 100 may be operated in accordance with the processes described in, FIG. 2, FIG. 3 and FIG. 4.

In block 202, process for numbering flowchart elements 200 provides a numbering schema. In block 204, process for numbering flowchart elements 200 populates a chart node collection of chart nodes on a display surface. In block 206, process for numbering flowchart elements 200 examines the chart node collection of chart nodes with a link parser to count the number of inbound links on each chart node and generate a connection list of which nodes are connected to which other chart nodes. In block 208, process for numbering flowchart elements 200 configures a root identifier with a connection list to identify the chart nodes with no inbound links as root nodes and add the root nodes to a root node list. In block 210, process for numbering flowchart elements 200 applies a geometric ranker to a chart node collection to generate a geometric rank.

In block 212, process for numbering flowchart elements 200 configures a geometric ranker to rank a first chart node within the chart node collection based on the first chart node's first axis value relative to the chart node collection's constituent nodes, the geometric ranker ranks the first chart node within the chart node collection based on the first chart node's second axis value, if the first axis value for the first chart node is within a tolerance value of the first axis value of the chart node collection's constituent nodes.

In block 214 process for numbering flowchart elements 200 add the first chart node to an ordered enumeration list. In block 212, process for numbering flowchart elements 200 configures the geometric ranker to rank a tree based the geometric rank of the root node of the tree.

In block 214, process for numbering flowchart elements 200 configures the geometric ranker to rank a branch within the tree based on the geometric rank of the root node of the branch. In block 216, process for numbering flowchart elements 200 configures the geometric ranker to rank a chart node within the branch based on the geometric rank of the chart node.

In block 218 process for numbering flowchart elements 200 configures a sequencer with the numbering schema to generate a node number, configures an associator to associate node number with node. In done block 220 process for numbering flowchart elements 200 ends.

The process for numbering flowchart elements 200 improves the efficiency of the computer by minimizing the need for additional input when organizing graphical charts. By automatically ranking the chart nodes by geometric location, the chart minimizes the need for additional re-rendering of user interfaces and configuration of the user interface by user input.

By utilizing existing user input to extrapolate and predict the sequential context of the graphical chart, the interface allows the user to interact with the underlying machine more intuitively. This not only increases the user's efficiency, but may also increase the quality of output from the machine. This may further increase the efficiency of the machine itself by reducing the required number of human inputs generally, (in particular, erroneous inputs) and thereby reducing the amount of resources devoted to human-machine interactions.

A method for numbering flowchart elements may include providing a numbering schema, populating a chart node collection on a display surface, examining the chart node collection with a link parser to count the number of inbound links on a chart node and generate a connection list. The process may then configure a root identifier with the connection list to identify the chart nodes with no inbound links as root nodes and add the root nodes to a root node list, then applying a geometric ranker to the chart node collection to generate a geometric rank. The geometric ranker may be configured to rank a tree based the geometric rank of the root node of the tree, to rank a branch within the tree based on the geometric rank of the root node of the branch, and to rank the chart node within the branch based on the geometric rank of the chart node. The process may then number the chart nodes on the display surface.

Applying a geometric ranker to the chart node collection to generate a geometric rank may include ranking a first chart node within the chart node collection based on the first chart node's first axis value relative to the chart node collection's constituent nodes; ranking the first chart node within the chart node collection based on the first chart node's second axis value, if the first axis value for the first chart node is within a tolerance value of the first axis value of at least one of the chart node collection's constituent nodes; and/or add the first chart node to an ordered enumeration list.

Numbering the chart nodes on the display surface may include configuring a sequencer with the numbering schema to generate a node number, configuring an associator with the node number and an enumerated chart node from the ordered enumeration list to associate the chart node with the node number, and/or displaying the node number on the display surface.

In some embodiments, configuring the root identifier to identify the chart nodes may further include configuring the root identifier with the geometric ranker to identify the chart node, with the the geometric rank that is the highest, as the root node and add it to the root node list, if none of the chart nodes in the tree have inbound links.

The geometric ranker may be triggered to rank both parent branches if a chart node has two parent-nodes. The process for numbering flowchart the elements may be triggered when the arrangement of the chart nodes is changed on the display surface.

In block 302, process for generating a geometric rank 300 ranks a first chart node within the chart node collection based on the first chart node's first axis value relative to the chart node collection's constituent nodes.

In block 304, process for generating a geometric rank 300 ranks a first chart node within the chart node collection based on the first chart node's second axis value if the first axis value is within a tolerance value of the first axis value of at least one of the chart node collection's constituent nodes. In block 306, the first chart node is added to an ordered enumeration list. In done block 308, process for generating a geometric rank 300 ends.

In block 402, process for numbering chart nodes on a display surface 400 configures a sequencer with the numbering schema to generate a node number.

In block 404 process for numbering chart nodes on a display surface 400 configures an associator with the node number and an enumerated chart node from the ordered enumeration list to associate the chart node with the node number.

In block 406, process for numbering chart nodes on a display surface 400, displays the node number on the display surface. In done block 408 process for numbering chart nodes on a display surface 400 ends.

Figure 5:
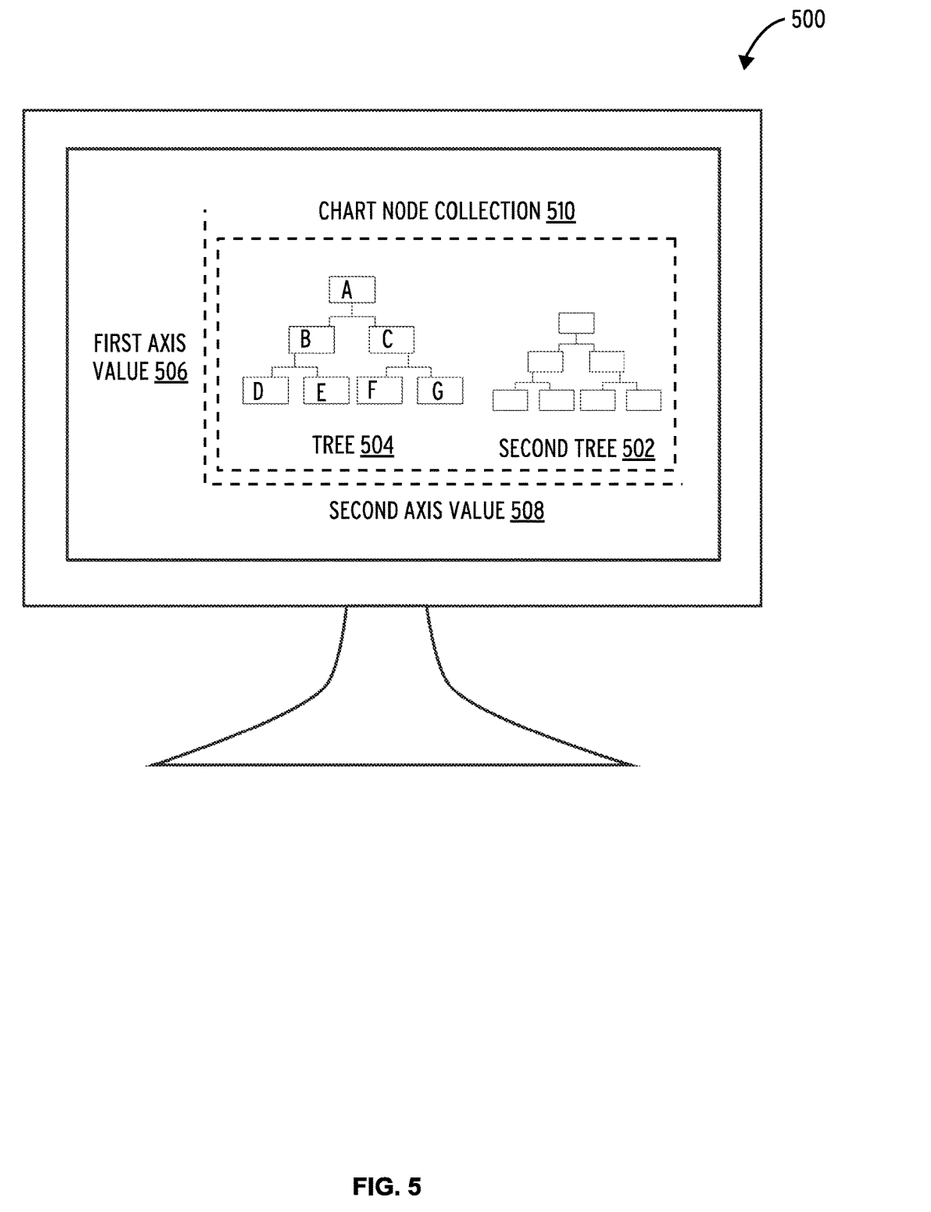
FIG. 5 illustrates an embodiment of a system for numbering flowchart elements 500.

FIG. 5 illustrates an embodiment of a system for numbering flowchart elements 500.

The system for numbering flowchart elements 500 comprises a chart node collection 510, first axis value 506 and a second axis value 508.

The chart node collection 510 further comprises a tree 504 and a second tree 502.

The tree 504 and the second tree 502 may be ranked geometrically within the chart node collection 510 based on a rank determined by the first axis value 506 and the second axis value 508.

Figure 6:
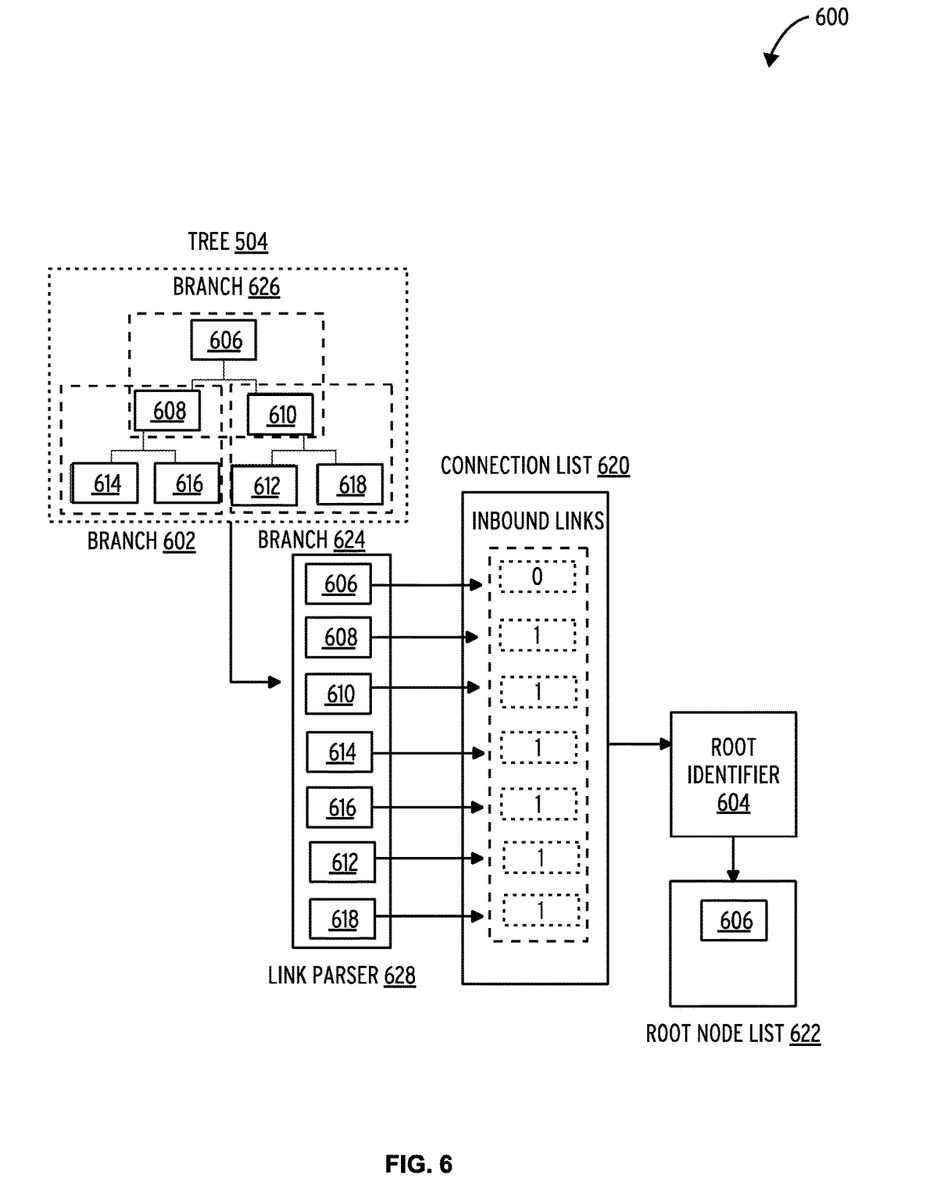
FIG. 6 illustrates an embodiment of a system for numbering flowchart elements 600.

FIG. 6 illustrates an embodiment of a system for numbering flowchart elements 600.

The system for numbering flowchart elements 600 comprises a tree 504, a root identifier 604, a connection list 620, a root node list 622, and link parser 628.

The tree 504 further comprises branch 626, branch 602, and branch 624. Branch 626 further comprises root node 606, chart node 608, and chart node 610. Branch 602 further comprises chart node 608, chart node 614, and chart node 616. Branch 624 further comprises chart node 610, chart node 612, and chart node 618.

The nodes may be parsed through the link parser 628 to identify links between nodes. The link parser 628 compiles a connection list 620 of inbound links to each of the nodes which is processed by the root identifier 604, and the identified root node 606 is added to the root node list 622.

Figure 7:
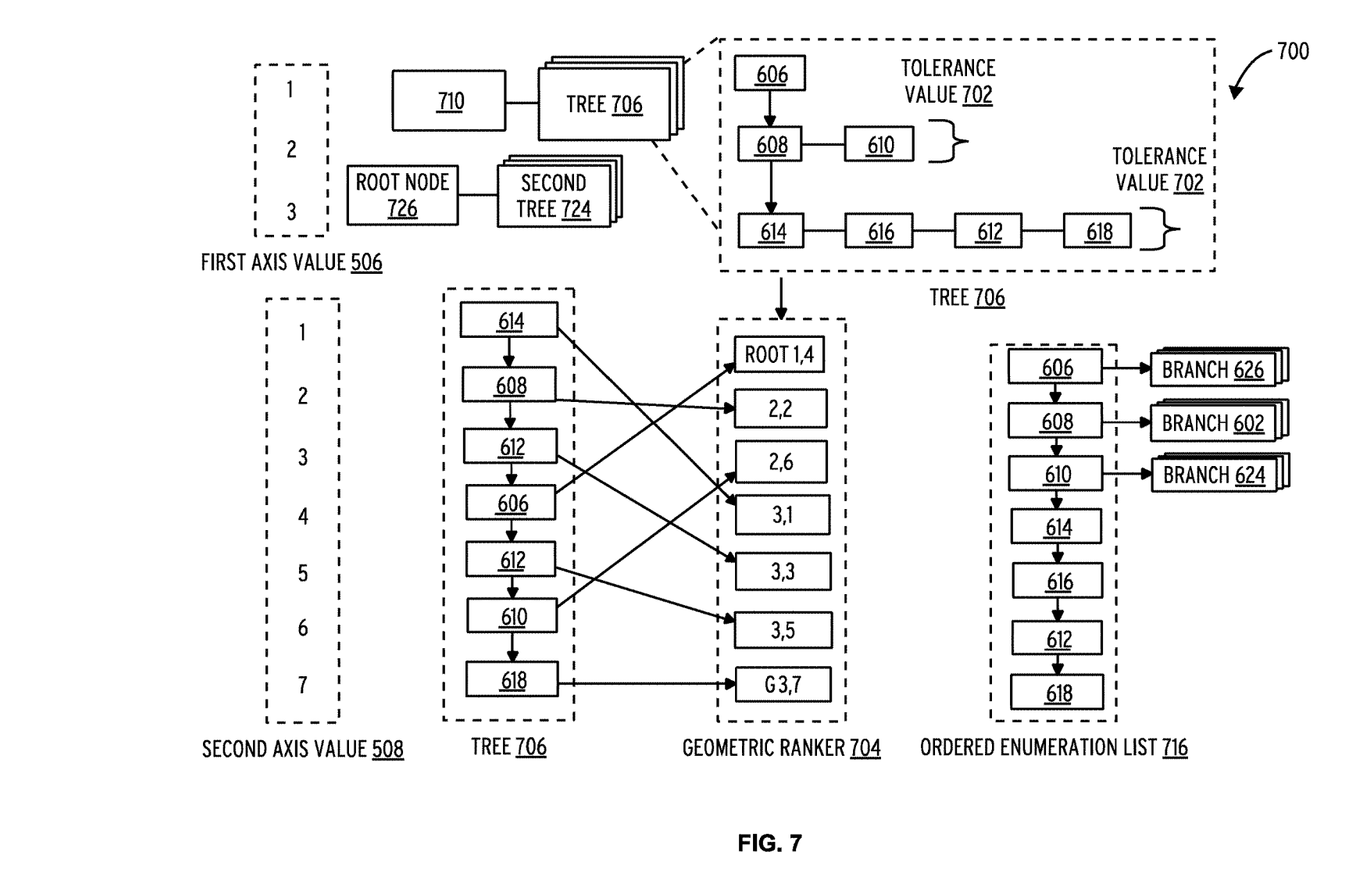
FIG. 7 illustrates an embodiment of a system for numbering flowchart elements 700.

FIG. 7 illustrates an embodiment of a system for numbering flowchart elements 700.

The system for numbering flowchart elements 700 comprises a branch 602, a root node 606, a chart node 608, a chart node 610, a chart node 612, a chart node 614, a chart node 616, a chart node 618, a branch 624, a branch 626, a first axis value 506, a geometric ranker 704, a tree 706, a second axis value 508, a root node 710, a tolerance value 702, a tolerance value 702, an ordered enumeration list 716, a second tree 724, and a root node 726.

The system for numbering flowchart elements 700 ranks the root node 710 of tree 706 against a first axis value 506. The individual nodes are evaluated against the first axis value 506, nodes within a tolerance value 702 of one another may also be ranked relative to a second axis value 508. The geometric ranker 704 may rank the nodes geometrically relative to their root on a given branch and relative to the axis values of other nodes. The nodes root node 606, chart node 608, chart node 610, chart node 614, chart node 616, chart node 612, chart node 618 are added to the ordered enumeration list 716. Branch 626, branch 602, and branch 624, may be ranked based on their identified root nodes root node 606, chart node 608 and chart node 610, respectively.

Figure 8:
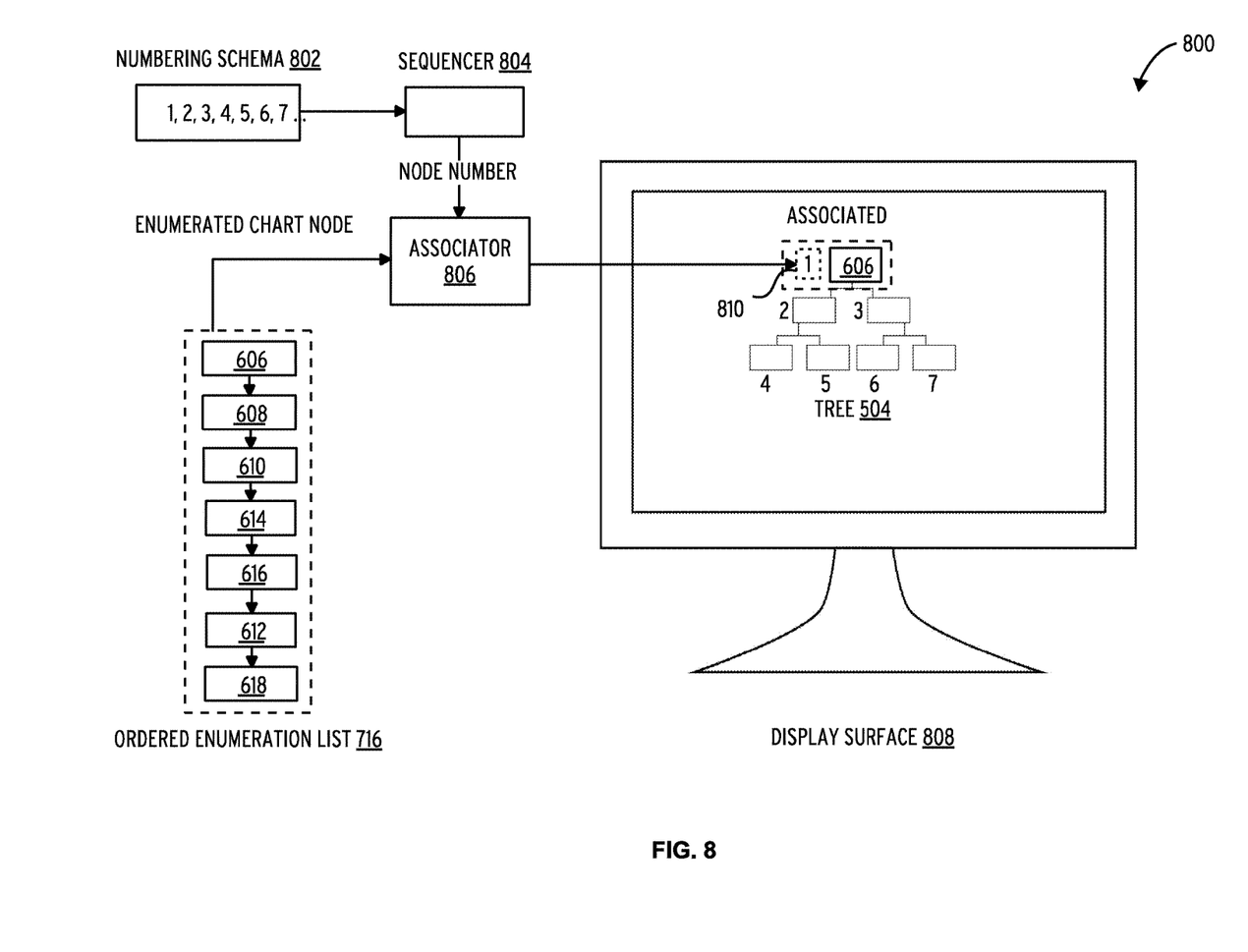
FIG. 8 illustrates an embodiment of a system for numbering flowchart elements 800.

FIG. 8 illustrates an embodiment of a system for numbering flowchart elements 800.

The system for numbering flowchart elements 800 comprises a tree 504, an ordered enumeration list 716, a numbering schema 802, a sequencer 804, an associator 806, a display surface 808, and a node number 810.

Ordered enumeration list 716 further comprises root node 606, chart node 608, chart node 610, chart node 614, chart node 616, chart node 612, and chart node 618.

The numbering schema 802 may be applied to the sequencer 804 to configure it with a framework for numbering associated nodes. The sequencer may then generate the proper numbers to identify the number of nodes in the 716 in a sequence. The associator 806 may then associate each element on the ordered enumeration list 716 with a number which has been generated by the sequencer 804. The node number 810 is displayed on the display surface 808 with the associated root node 606.

Figure 9:
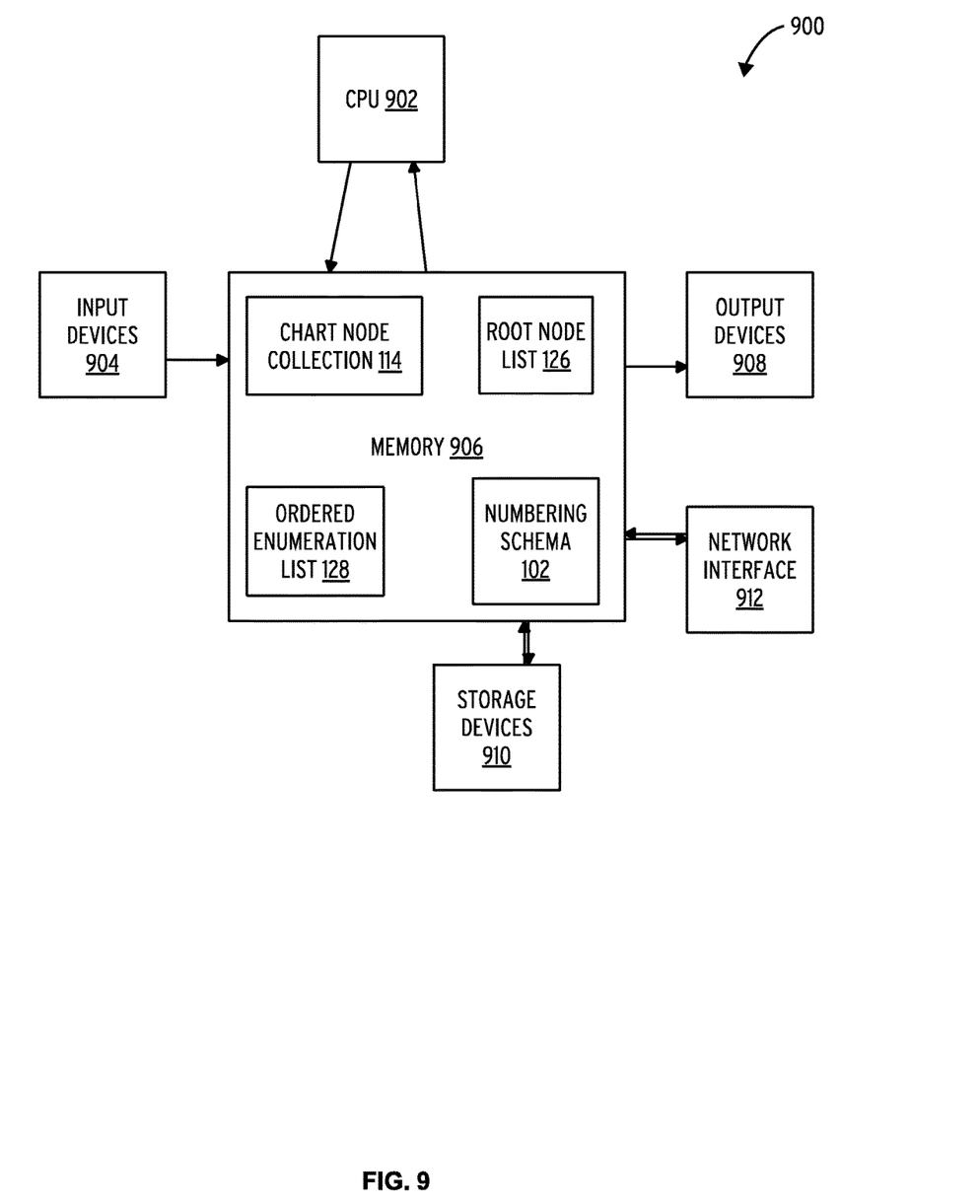
FIG. 9 illustrates an embodiment of a digital apparatus 900 to implement components and process steps of the system described herein.

FIG. 9 illustrates an embodiment of a digital apparatus 900 to implement components and process steps of the system described herein.

Input devices 904 comprise transducers that convert physical phenomenon into machine internal signals, typically electrical, optical or magnetic signals. Signals may also be wireless in the form of electromagnetic radiation in the radio frequency (RF) range but also potentially in the infrared or optical range. Examples of input devices 904 are keyboards which respond to touch or physical pressure from an object or proximity of an object to a surface, mice which respond to motion through space or across a plane, microphones which convert vibrations in the medium (typically air) into device signals, scanners which convert optical patterns on two or three dimensional objects into device signals. The signals from the input devices 904 are provided via various machine signal conductors (e.g., busses or network interfaces) and circuits to memory 906.

The memory 906 is typically what is known as a first or second level memory device, providing for storage (via configuration of matter or states of matter) of signals received from the input devices 904, instructions and information for controlling operation of the CPU 902, and signals from storage devices 910.

Information stored in the memory 906 is typically directly accessible to the CPU 902 of the device. Signals input to the device cause the reconfiguration of the internal material/energy state of the memory 906, creating in essence a new machine configuration, influencing the behavior of the digital apparatus 900 by affecting the behavior of the CPU 902 with control signals (instructions) and data provided in conjunction with the control signals.

Second or third level storage devices 910 may provide a slower but higher capacity machine memory capability. Examples of storage devices 910 are hard disks, optical disks, large capacity flash memories or other non-volatile memory technologies, and magnetic memories.

The CPU 902 may cause the configuration of the memory 906 to be altered by signals in storage devices 910. In other words, the CPU 902 may cause data and instructions to be read from storage devices 910 in the memory 906 from which may then influence the operations of CPU 902 as instructions and data signals, and from which it may also be provided to the output devices 908. The CPU 902 may alter the content of the memory 906 by signaling to a machine interface of memory 906 to alter the internal configuration, and then converted signals to the storage devices 910 to alter its material internal configuration. In other words, data and instructions may be backed up from memory 906, which is often volatile, to storage devices 910, which are often non-volatile.

Output devices 908 are transducers which convert signals received from the memory 906 into physical phenomenon such as vibrations in the air, or patterns of light on a machine display, or vibrations (i.e., haptic devices) or patterns of ink or other materials (i.e., printers and 3-D printers).

The network interface 912 receives signals from the memory 906 and converts them into electrical, optical, or wireless signals to other machines, typically via a machine network. The network interface 912 also receives signals from the machine network and converts them into electrical, optical, or wireless signals to the memory 906.

Those having skill in the art will appreciate that there are various logic implementations by which processes and/or systems described herein can be effected (e.g., hardware, software, or firmware), and that the preferred vehicle will vary with the context in which the processes are deployed. If an implementer determines that speed and accuracy are paramount, the implementer may opt for a hardware or firmware implementation; alternatively, if flexibility is paramount, the implementer may opt for a solely software implementation; or, yet again alternatively, the implementer may opt for some combination of hardware, software, or firmware. Hence, there are numerous possible implementations by which the processes described herein may be effected, none of which is inherently superior to the other in that any vehicle to be utilized is a choice dependent upon the context in which the implementation will be deployed and the specific concerns (e.g., speed, flexibility, or predictability) of the implementer, any of which may vary. Those skilled in the art will recognize that optical aspects of implementations may involve optically-oriented hardware, software, and or firmware.

Those skilled in the art will appreciate that logic may be distributed throughout one or more devices, and/or may be comprised of combinations memory, media, processing circuits and controllers, other circuits, and so on. Therefore, in the interest of clarity and correctness logic may not always be distinctly illustrated in drawings of devices and systems, although it is inherently present therein. The techniques and procedures described herein may be implemented via logic distributed in one or more computing devices. The particular distribution and choice of logic will vary according to implementation.

The foregoing detailed description has set forth various embodiments of the devices or processes via the use of block diagrams, flowcharts, or examples. Insofar as such block diagrams, flowcharts, or examples contain one or more functions or operations, it will be understood as notorious by those within the art that each function or operation within such block diagrams, flowcharts, or examples can be implemented, individually or collectively, by a wide range of hardware, software, firmware, or virtually any combination thereof. Portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in standard integrated circuits, as one or more computer programs running on one or more processing devices (e.g., as one or more programs running on one or more computer systems), as one or more programs running on one or more processors (e.g., as one or more programs running on one or more microprocessors), as firmware, or as virtually any combination thereof, and that designing the circuitry or writing the code for the software or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies equally regardless of the particular type of signal bearing media used to actually carry out the distribution. Examples of a signal bearing media include, but are not limited to, the following: recordable type media such as floppy disks, hard disk drives, CD ROMs, digital tape, flash drives, SD cards, solid state fixed or removable storage, and computer memory.

In a general sense, those skilled in the art will recognize that the various aspects described herein which can be implemented, individually or collectively, by a wide range of hardware, software, firmware, or any combination thereof can be viewed as being composed of various types of circuitry.

Those skilled in the art will recognize that it is common within the art to describe devices or processes in the fashion set forth herein, and thereafter use standard engineering practices to integrate such described devices or processes into larger systems. At least a portion of the devices or processes described herein can be integrated into a network processing system via a reasonable amount of experimentation. Various embodiments are described herein and presented by way of example and not limitation.

What is claimed is:

1. A method for numbering flowchart elements comprising:
    examining a chart node collection on a display surface with a link parser to count the number of inbound links on a chart node and generating a connection list;
    configuring a root identifier with the connection list to identify the chart nodes with no inbound links as root nodes and add the root nodes to a root node list;
    applying a geometric ranker to the chart node collection to generate a geometric rank comprising:
        ranking a first chart node within the chart node collection based on the first chart node's first axis value relative to the chart node collection's constituent nodes;
    ranking the first chart node within the chart node collection based on the first chart node's second axis value, if the first axis value for the first chart node is within a tolerance value of the first axis value of at least one of the chart node collection's constituent nodes;
    adding the first chart node to an ordered enumeration list;
    configuring the geometric ranker to rank a tree based at least in part on the geometric rank of the root node of the tree;
        configuring the geometric ranker to rank a branch within the tree based on the geometric rank of the root node of the branch;
        configuring the geometric ranker to rank the chart node within the branch based on the geometric rank of the chart node;
    configuring the root identifier with the geometric ranker to identify the chart node, with the geometric rank that is the highest, as the root node and add it to the root node list, if none of the chart nodes in the tree have inbound links;
    numbering the chart nodes comprising: configuring a sequencer with a numbering schema to generate a node number; and
    configuring an associator with the node number and an enumerated chart node from the ordered enumeration list to associate the chart node with the node number; and
    populating the chart node collection on the display surface.

2. The method of claim 1, wherein the numbering schema is user-provided.

3. The method of claim 1, wherein the chart node collection is populated on the display surface.

4. The method of claim 1, wherein if the chart node has two parent-nodes the geometric ranker is triggered to rank both parent branches.

5. The method of claim 1, wherein the process for numbering flowchart elements is triggered when the arrangement of the chart nodes is changed on the display surface.

6. The method of claim 1, wherein the node number is displayed on the display surface.

* * * * *